United States Patent [19]

Watson

[11] 4,372,168
[45] Feb. 8, 1983

[54] FLOWMETER

[75] Inventor: Christopher A. Watson, Upland, Calif.

[73] Assignee: International Telephone and Telegraph Corporation, New York, N.Y.

[21] Appl. No.: 271,396

[22] Filed: Jun. 8, 1981

[51] Int. Cl.³ .............................................. G01F 1/66
[52] U.S. Cl. .................................................. 73/861.28
[58] Field of Search ................. 73/861.27, 861.28, 597

[56] References Cited

U.S. PATENT DOCUMENTS 4,069,713  1/1978  Gassmann ........................ 73/861.28
4,185,498  1/1980  Watson ............................ 73/861.27

*Primary Examiner*—Charles A. Ruehl

[57] ABSTRACT

An ultrasonic flowmeter including two phase locked loops with four voltage controlled oscillators, a portion of each loop forming a common path through amplifiers, an electronic attenuator with automatic gain control, a pulse detector, and a pulse or phase comparator. The pulse comparator, through switches, controls the voltage controlled oscillators on a time shared basis. The voltage controlled oscillators are always driven until a later counter pulse coincides with a corresponding received pulse. Time sharing is, in part, accomplished by beginning energy propagation in opposite directions at successive times and before either pulse is received. The oscillators are also alternated to eliminate a zero frequency shift by transmitting alternately at higher and lower frequencies from each transducer.

8 Claims, 5 Drawing Figures

FLOWMETER

BACKGROUND OF THE INVENTION

This invention relates to a fluid property detector in which pulses are alternately transmitted upstream and downstream, and more particularly to apparatus in which the output frequencies of four voltage controlled oscillators are varied in a manner to keep transit times in opposite directions between a pair of transducers equal to integral multiples of the output pulses of corresponding oscillators while eliminating a zero frequency shift.

PRIOR ART STATEMENT

There is considerable zero frequency shift in other art prior to the present invention, much of which will be found in Subclasses 194A Class 73 of the U.S. Patent and Trademark Office Manual of Classification.

Perhaps more pertinent prior art includes Gassmann U.S. Pat. No. 4,069,713 issued Jan. 24, 1978, in which two voltage controlled oscillators are employed, and Watson U.S. Pat. No. 4,185,498 issued Jan. 29, 1980.

SUMMARY OF THE INVENTION

In accordance with the flowmeter of the present invention, the above-described and other disadvantages of the prior art are overcome by connecting two or four voltage controlled oscillators alternately in two phase locked loops. A constant frequency shift error due to a difference between loops is then avoided because a negative shift is added to a positive shift of equal magnitude. Cancellation of the error then occurs.

BRIEF DESCRIPTION OF THE DRAWINGS

In the accompanying drawings which illustrate exemplary embodiments of the present invention.

DESCRIPTION OF THE PREFERRED EMBODIMENT

Figure 1:
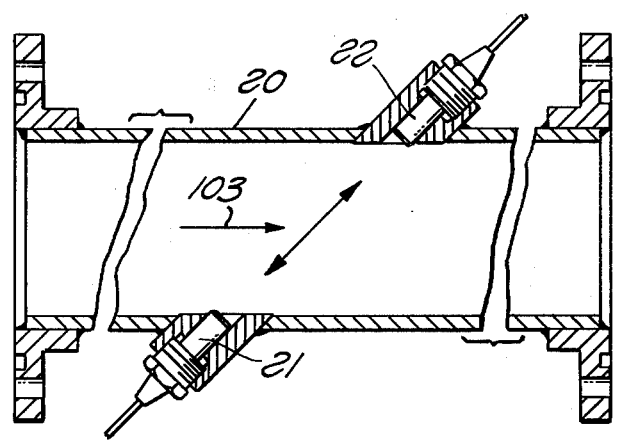
FIG. 1 is a longitudinal sectional view, partly in elevation, of a portion of a flowmeter constructed in accordance with the present invention.

A pipe section 20 is shown in FIG. 1 having transducers 21 and 22 mounted therein to transmit vibrations toward each other, and to receive the vibrations. The arrangement in FIG. 1 may be entirely conventional.

Flanges with bolt holes and O-ring grooves may be fixed to pipe section 20 for attachment in a pipeline.

Figure 2:
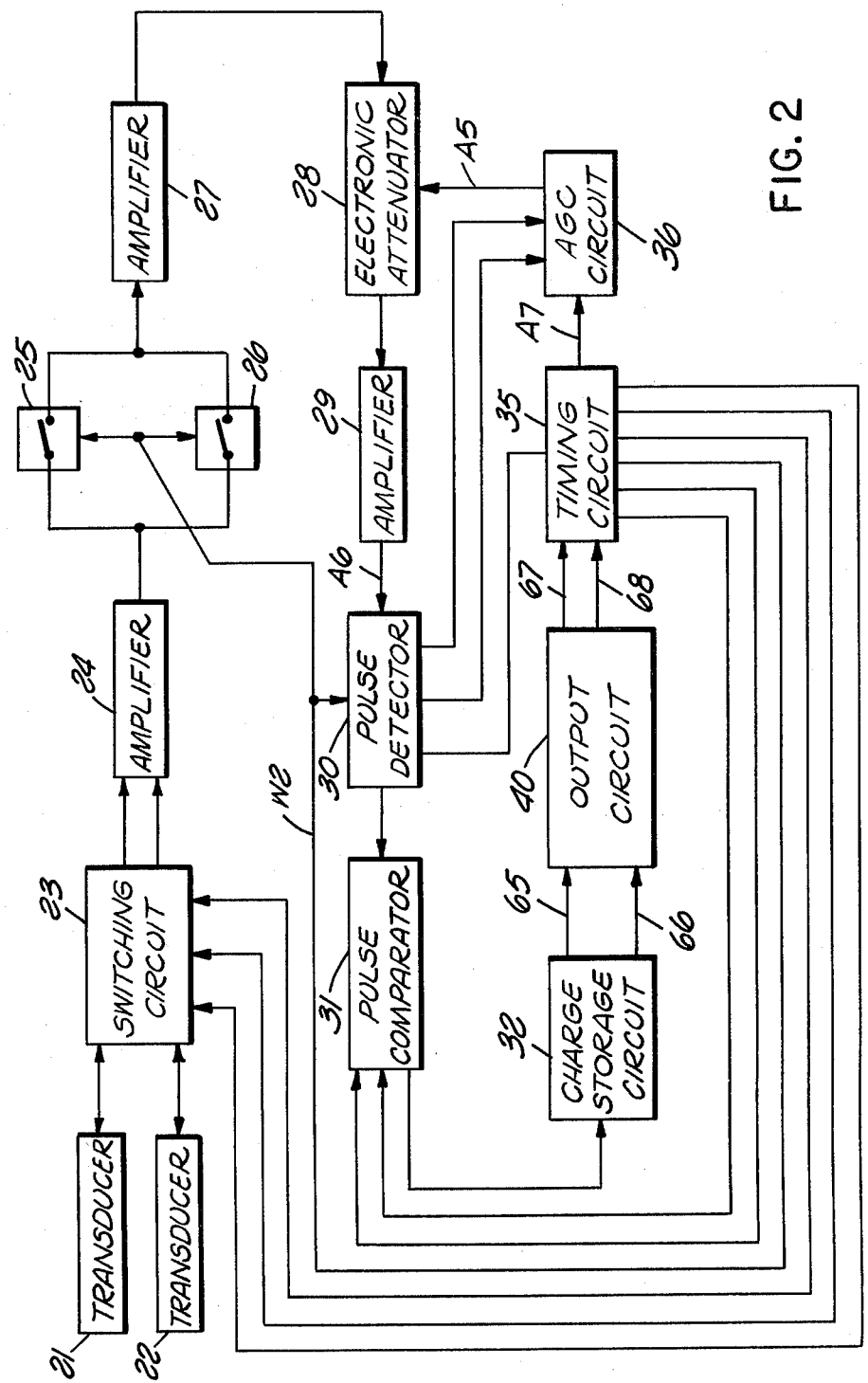
FIG. 2 is a block diagram of the flowmeter of the present invention.

In FIG. 2, transducers 21 and 22 are shown connected to a switching circuit 23.

The output of circuit 23 is impressed upon an amplifier 24 which passes through electronic switches 25 or 26 to an amplifier 27. Amplifier 24 and switches 25 and 26 may be conventional—a single chip (integrated circuit) Motorola MC1445.

The output of amplifier 27 passes through an electronic attenuator 28 or variable gain amplifier 29 to a pulse detector 30.

Amplifier 29 may be the same as or similar to Motorola MC1733.

The output of pulse detector 30 is impressed upon a pulse comparator 31 and thence through a charge storage circuit 32 and an output circuit 40.

The outputs of circuit 40 are impressed upon a timing circuit 35. Timing circuit 35 has an output W2 which is impressed upon pulse detector 30 and switches 25 and 26. An AGC circuit 36 receives an input from circuit 35, and two inputs from detector 30, and provides an output A5 to electronic attenuator 28. The signal received by circuit 36 from circuit 36 is A7.

Timing circuit 35 provides three inputs to switching circuit 23. Timing circuit 35 also provides an input to pulse detector 30. The output of amplifier 29 to pulse detector 30 is A6. Pulse comparator 31 has two inputs to charge storage circuit 32 and two inputs from timing circuit 35.

The invention, as shown in FIG. 2, actually includes two phase-locked loops, a portion of one path being common with the other. For example, transducers 21 and 22 are used both to transmit and to receive alternately. Further, the path from amplifier 27 to pulse comparator 31 is common although it is used for output circuit 40 on a time shared basis.

In FIG. 2, amplifier 24, switches 25 and 26, amplifier 27, electronic attenuator 28 and amplifier 29 may be entirely conventional. The same is true of all structures shown in FIG. 2 except output circuit 40. All the structures shown in FIG. 2 may be identical to corresponding ones shown in said Watson patent except said output circuit 40. Said Watson patent is hereby incorporated herein by this reference hereto.

A transmit pulse TX causes only one of the two transducers 21 and 22 to transmit at one time. Circuit 23 receives two other pulses. Transducers 21 and 22 act like capacitors and may be crystal transducers. Energy release occurs on transducer discharge. Transmit time in FIG. 1 from transducer 21 to transducer 22 determines a high VCO frequency ($f_m$) if arrow 103 is in the direction of flow. $f_m$ is determined when a pulse is transmitted from transducer 21 to transducer 22. There is a common discharge path of transducers 21 and 22 (not shown); however, only one pulse is transmitted because a pulse charges transducer 21 immediately after transducer 22 has been discharged and vice versa. Thus, the next discharge of transducer 21 has no substantial effect on transducer 22 because transducer 22 has been more or less fully discharged and is not charged by another pulse until transducer 21 has been discharged.

Typically $f_m$ may be variable about 283 KHz and $f_n$ may be 280 KHz, both perhaps at 281.500 KHz at zero flow.

Figure 4:
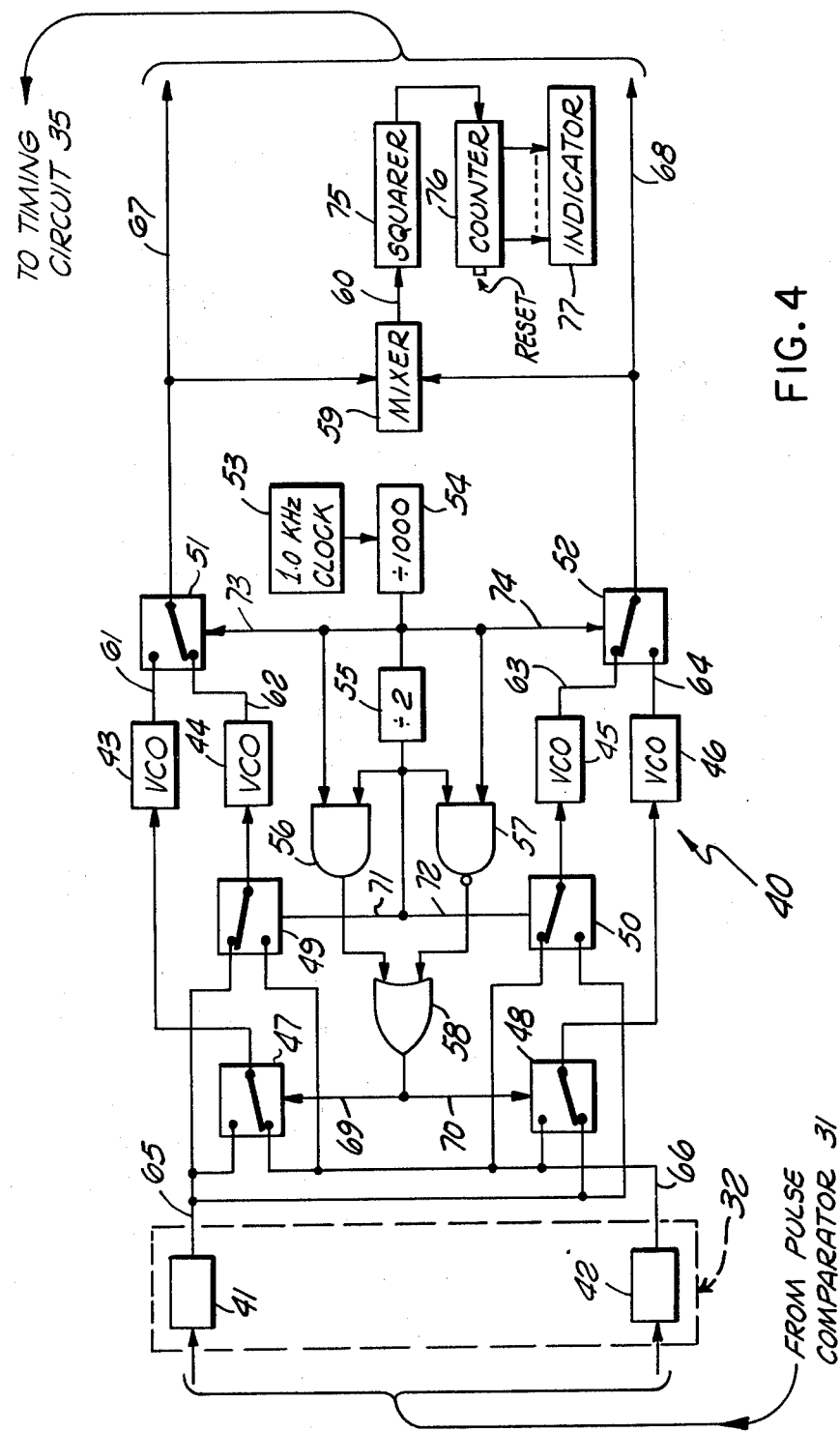
FIG. 4 is a block diagram of a charge storage circuit and an output circuit shown in FIG. 2.

The basic system operation relies on two phase locked loops, a portion of each path being common. This reduces chance for error. The phase locked loops are closed loop oscillators that run at frequencies corresponding to the appropriate propagation time across the fluid path. The term "lock" means that input "error" (i.e. the small time difference between certain $T_R$ and $R_X$ pulse edges not shown) can cause a small modification of a VCO frequency $f_m$ and/or $f_n$ that tends to reduce the error. With a modest gain, the error can be negligible especially if a circuit the same as or similar to that of FIG. 4 is employed. There is a dynamic situation, however, and this allows each VCO signal frequency to timing circuit 35 (FIG. 2) to follow the fluctuation in flow.

Figure 3:
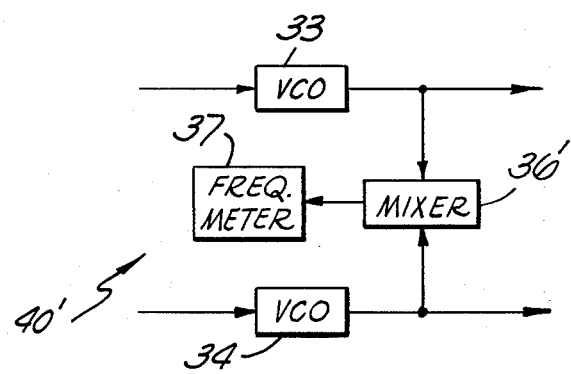
FIG. 3 is a block diagram of a conventional output circuit.

If output circuit 40 were deleted in FIG. 2, and circuit 40' in FIG. 3 were substituted therefor, FIG. 2 as modified in this manner would be entirely conventional.

As shown in FIG. 3, voltage controlled oscillators 33 and 34 provide outputs to a mixer 36 and to timing circuit 35 from charge storage circuit 32 (refer back to FIG. 2).

The mixer 36 (and mixer 59 in FIG. 4) produce a beat frequency. A frequency meter 37 in FIG. 3 may read the beat frequency. Meter 37 may be calibrated in volume units per unit time, if desired.

As stated previously, the flowmeter of FIG. 2 may be old in the art and may be similar to or identical to that shown in said Watson patent except for output circuit 40.

Output circuit 40 and charge storage circuit 32 are shown in FIG. 4. Circuit 32 has portions 41 and 42 with D.C. voltages thereon to effect corresponding frequencies at the outputs of voltage controlled oscillators (VCO's) 43, 44, 45 and 46.

Electronic switches are provided at 47, 48, 49, 50, 51 and 52 driven by a 1.0 kilohertz clock 53, frequency dividers 54 and 55, an AND gate 56, a NAND gate 57 and an OR gate 58.

Switches 47-52 are, per se, conventional. The same is true of clock 53, dividers 54 and 55, and gates 56, 57 and 58.

A mixer is provided at 59, as stated previously. Mixer 59 is also, per se, conventional.

Mixer 59 produces an output signal of frequency $f_d$ on an output lead 60 where $$f_d = |f_m - f_n|$$

Any other variable $f_o$ may be defined as $$f_o = K f_d$$

where K is a constant.

The magnitudes of frequencies $f_m$ and $f_n$ may be described as follows.

When switches 47-52 are in the diagrammatic position shown, a VCO output signal on lead 61 has a frequency $f_n$. Leads 62, 63 and 64 (in the case just described) carry signals that have respective frequencies $f_m$, $f_n$ and $f_m$.

Frequencies $f_m$ and $f_n$ will be different by an amount proportional to the rate of volume flow of a fluid flowing within pipe section 20. Frequencies $f_m$ and $f_n$, are functions of the volume flow rate of the fluid in pipe section 20. Both $f_m$ and $f_n$ most likely will be and are expected to be known variable functions of the said volume flow rate.

The function of output circuit 40 in FIG. 4 may be better understood from a brief description of FIGS. 2 and 3.

Charge storage circuit 32 in FIGS. 2 and 4 has output voltages $u_m$ and $u_n$ on leads 65 and 66, respectively. See also the said Watson patent and for operation.

Typically, $$f_m \sim u_m$$

$$f_n \sim u_n$$

$$f_m > f_n$$

Output leads 67 and 68 in FIGS. 2 and 4 carry signals which change in frequency as will be described.

The flowmeter of FIG. 2 utilizes alternate pairs of the VCO's shown in FIG. 4 instead of VCO 33 and 34 shown in FIG. 3. Mixer 59 (FIG. 4) performs the same function as mixer 36 (FIG. 3).

In FIG. 4, leads 67 and 68 alternately carry signals of frequencies $f_m$ and $f_n$, respectively, and $f_n$ and $f_m$, respectively.

The reversal of $f_m$ and $f_n$ on leads 67 and 68 causes a cancellation of a frequency shift error. By using four instead of two VCO's, the transient signals on output leads 61-64 other than those caused by a change in the fluid flow rate in pipe section 20 does not interfere with accurate flow measurement. This is true because the VCO's are allowed to settle down over the first half of each of the periods $T_m$ and $T_n$.

Figure 5:
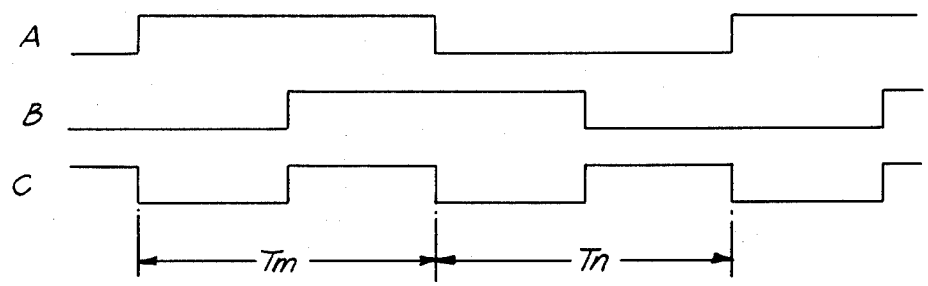
FIG. 5 is a graph of a group of waveforms illustrating the operation of the output circuit of FIG. 4.

Switch gating signals are supplied via leads 69, 70, 71, 72, 73 and 74. Signal A in FIG. 5 is carried by leads 69 and 70, signal B by leads 71 and 72, and signal C by leads 73 and 74. Switch 47, for example, may be as shown when signal A is low.

Leads 67 and 68 (FIG. 4) carry signals of frequencies $f_m$ and $f_n$, respectively, during periods $T_m$ (FIG. 5) and of frequencies $f_n$ and $f_m$, respectively during periods $T_n$ (FIG. 5).

$$f_m \neq 1/T_m$$

$$f_n \neq 1/T_n$$

Typically $T_m = T_n$ and $$T_n = 2 \text{ seconds}$$

In FIG. 4, the frequency $f_d$ appearing upon lead 60 is squared up by squarer 75. The output of squarer 75 is then counted by counter 76 and indicated by an indicator 77. Indicator 77 then indicates total volume flow.

Alternatively, counter 76 may also be an updated counter responsive partly to the signal on lead 74.

The frequencies $f_m$ and $f_n$ will not normally be constant.

Typically, though, the following may momentarily occur:

$$f_m = 283.000 \text{ KHz}$$

$$f_n = 280.000 \text{ KHz}$$

The condition $f_m = f_n$ occurs at zero flow rate. Perhaps at 281.500 KHz.

What is claimed is:

1. In an ultrasonic flowmeter, the combination comprising: a pipe section; a first transducer mounted in said pipe section to transmit and to receive vibrations along an axis; a second transducer mounted in said pipe section on said axis and spaced from said first transducer to transmit and to receive vibrational energy respectively transmitted to and from said first transducer; at least first and second voltage controlled oscillators having first and second output leads; means to cause said first and second voltage controlled oscillators to produce first and second output signals on said first and second output leads, respectively, of frequencies $f_m$ and $f_n$, respectively, where $$f_d = |f_m - f_n|$$

and $f_d$ is proportional to the volume flow rate of a fluid flowing in said pipe section; difference means having first and second input leads; first switch means alternately connecting said first and second input leads from said first and second output leads, respectively, and vice versa, at a first rate to produce a third output signal of a frequency $f_o$, where $f_o = Kf_d$ and K is a constant, said difference means having a third output lead which carries said third output signal; utilization means connected from said third output leads; second switch means to energize said first and second transducers alternately at a second rate substantially higher than said first rate and synchronously with said first and second voltage controlled oscillators, respectively; and a charge storage circuit connected from respective ones of said second and first transducers, said charge storage circuit controlling the frequencies of said first and second voltage controlled oscillators.

2. The invention as defined in claim 1, wherein said first switch means includes a clock to alternate the connections made by said first switch means at regular intervals.

3. The invention as defined in claim 2, wherein said utilization means includes a counter to count said frequency $f_o$, and means to indicate the count stored in said counter in units of volume per unit time.

4. The invention as defined in claim 1, wherein said utilization means includes a counter to count said frequency $f_o$, and means to indicate the count stored in said counter in units of volume per unit time.

5. In an ultrasonic flowmeter, the combination comprising: a pipe section; a first transducer mounted on said pipe section to transmit and to receive vibrations along an axis; a second transducer mounted on said pipe section on said axis and spaced from said first transducer to transmit and to receive vibrational energy respectively to and from said first transducer; a first voltage controlled oscillator (VCO) having an input and a first output lead; second, third and fourth VCO's each having an input and having second, third and fourth output leads, respectively; a charge storage circuit connected from said first and second transducers; means connected from said charge storage circuit to cause all of said VCO's to change frequency alternately from $f_m$ to $f_n$ and back again to $f_m$, and so forth, the envelope frequencies of said first and fourth VCO's being in phase with each other, the envelope frequencies of said second and third VCO's being in phase with each other, the envelope frequencies of said first and fourth VCO's being 90 electrical degrees out of phase with respect to the envelope frequencies of said second and third VCO's; difference means; first switch means connecting said first and fourth outputs to said difference means, and alternately connecting said second and third outputs thereto at a frequency synchronous with, but twice that of said envelope frequencies, said first switch means each time sampling the output signals of two of said VCO's in the second quarter of the envelope cycle of said two VCO's where $$f_d = |f_m - f_n|$$

and $f_o = Kf_d$, and $f_d$ is proportional to the volume flow rate of a fluid flowing in said pipe section, and K is a constant; utilization means connected from said difference means; and second switch means to energize said first and second transducers alternately at a frequency substantially higher than said envelope frequencies and synchronously with said first and second VCO's, respectively, said charge storage circuit controlling the frequencies of said first, second, third and fourth voltage controlled oscillators.

6. The invention as defined in claim 5, wherein said first switch means includes a clock to alternate the connections made by said first switch means at regular intervals.

7. The invention as defined in claim 6, wherein said utilization means includes a counter to count said frequency $f_o$, and means to indicate the count stored in said counter in units of volume per unit time.

8. The invention as defined in claim 5, wherein said utilization means includes a counter to count said frequency $f_o$, and means to indicate the count stored in said counter in units of volume per unit time.

* * * * *